United States Patent [19]

Ament et al.

[11] Patent Number: 5,695,217

[45] Date of Patent: Dec. 9, 1997

[54] SAFETY NET CONSTRUCTION

[75] Inventors: Eduard Ament, Aichwald; Holger Seel, Aidlingen, both of Germany

[73] Assignee: Baumeister & Ostler, Germany

[21] Appl. No.: 555,845

[22] Filed: Nov. 13, 1995

[30] Foreign Application Priority Data

Nov. 23, 1994 [DE] Germany ............ 44 41 610.5

[51] Int. Cl.[6] .................................................. B60R 21/06
[52] U.S. Cl. ............................................. 280/749; 280/748
[58] Field of Search .......................... 280/748, 749, 280/784; 296/152

[56] References Cited

U.S. PATENT DOCUMENTS

| | | | |
|---|---|---|---|
| 3,423,121 | 1/1969 | Lipkin | 280/749 |
| 5,290,086 | 3/1994 | Tucker | 280/749 |
| 5,472,063 | 12/1995 | Watanabe et al. | 280/784 |
| 5,477,938 | 12/1995 | Tsuji et al. | 280/784 |
| 5,551,726 | 9/1996 | Ament | 280/749 |

FOREIGN PATENT DOCUMENTS

| | | | |
|---|---|---|---|
| 640513 | 3/1995 | European Pat. Off. | 280/749 |
| 2457400 | 6/1976 | Germany | 280/784 |
| 4010209 | 10/1991 | Germany | 280/749 |
| 42 39 471 C2 | 9/1994 | Germany . | |

*Primary Examiner*—Eric D. Culbreth
*Attorney, Agent, or Firm*—Leydig, Voit & Mayer, Ltd.

[57] ABSTRACT

A safety net construction used to separate a passenger compartment from an article storage compartment includes a lower marginal edge provided with a frame piece having a pair of spaced apart weakened segments that permit redistribution of tension forces applied to the safety net. The lower marginal edge of the safety net is fastened to the vehicle at fastening locations spaced closer together than the spacing of the weakened segments.

14 Claims, 1 Drawing Sheet

5,695,217

SAFETY NET CONSTRUCTION

FIELD OF THE INVENTION

The present invention relates generally to vehicle safety devices, and more particularly, to a frame and attachment construction for use with a safety net that protects persons in the passenger compartment from projectiles thrust from the storage compartment in a utility vehicle.

BACKGROUND OF THE INVENTION

Many utility and sport vehicle interiors are configured with a cargo or storage compartment disposed directly to the rear of a passenger compartment. The boundary separating these spaces is primarily open such that the only obstruction therebetween is provided by the rear seat rest of the vehicle. This presents a fully exposed area between the upper edge of the rear seat rest and the interior vehicle roof. Accordingly, these configurations pose a potential safety risk in the event of a collision or sudden change of speed or direction of the vehicle. In these situations, unsecured cargo and the like may be thrust forward from the storage compartment space into the passenger compartment often causing injury to passengers there.

Prior safety net arrangements have been proposed to address this problem. For example, one known arrangement utilizes a generally rectangular safety net suspended between the passenger compartment and the storage compartment. The net arrangement attaches to the vehicle at its upper and lower side edges. In particular, the lower side edge of the net contains a lower rod-like frame, which in turn, is secured to the vehicle. Similarly, the upper side edge of the net contains an upper rod-like frame with ends that are sized for placement in corresponding receiving slots provided in the vehicle.

This known safety net arrangement restricts forward movement of objects that are flung from the storage compartment in the direction of the passenger compartment during a collision or the like. The impingement of objects onto the safety net, however, tends to apply undue tension to the lateral edges of the net. In some instances, the safety net becomes torn at its lateral edges and can no longer serve its intended purpose.

This problem may be worsened by forces acting upon the vehicle body during a collision. For example, deformation of the vehicle body may move the upper fastening point of the safety net away from the lower fastening point. In any event, it would be desirable to achieve an even distribution of tension forces applied to the safety net that avoid the risk of breakage or detachment of the net.

OBJECTS AND SUMMARY OF THE INVENTION

Accordingly, it is an object of the present invention to overcome the deficiencies in the prior art.

It is a more specific object of the present invention to provide a safety net construction that adequately addresses safety concerns in a utility vehicle.

It is another object of the present invention to provide a safety net construction that includes a frame support which is deformable in preselected locations to transfer tension forces applied to the net and to reduce the risk of tearing or breakage of the net.

These and other objects are achieved with a safety net construction according to the present invention. Structurally, the net construction includes a generally rectangular safety net body that extends substantially between the side walls of a utility vehicle. The net body includes fold-over strips disposed at each of its marginal edges. The fold-over strip located at the upper edge forms an elongate sleeve adapted to receive an upper frame piece with opposed ends secured proximate to the vehicle ceiling. Similarly, the fold-over strip located at the lower marginal edge is adapted to receive a lower frame piece. The lower edge of the net construction is secured to the vehicle from attachment locations spaced inwardly from the ends of the lower frame piece.

The lower frame piece includes a pair of spaced weakened or deformable sections, each of which is located intermediate to a respective attachment location and a lower frame end. The lower frame piece collapses at the weakened sections when tension forces are applied to the net to transfer the tension forces from the lateral edges toward the central portion of the net. The placement of the lower frame weakened sections and attachment locations, in conjunction with the wedge-like folds at the outer margins of the safety net cooperate to reduce the application of localized tension forces at the outer margins of the net when a projectile is received in the net. Accordingly, the risk of tearing or breakage of the safety net is significantly reduced.

Figure 1:
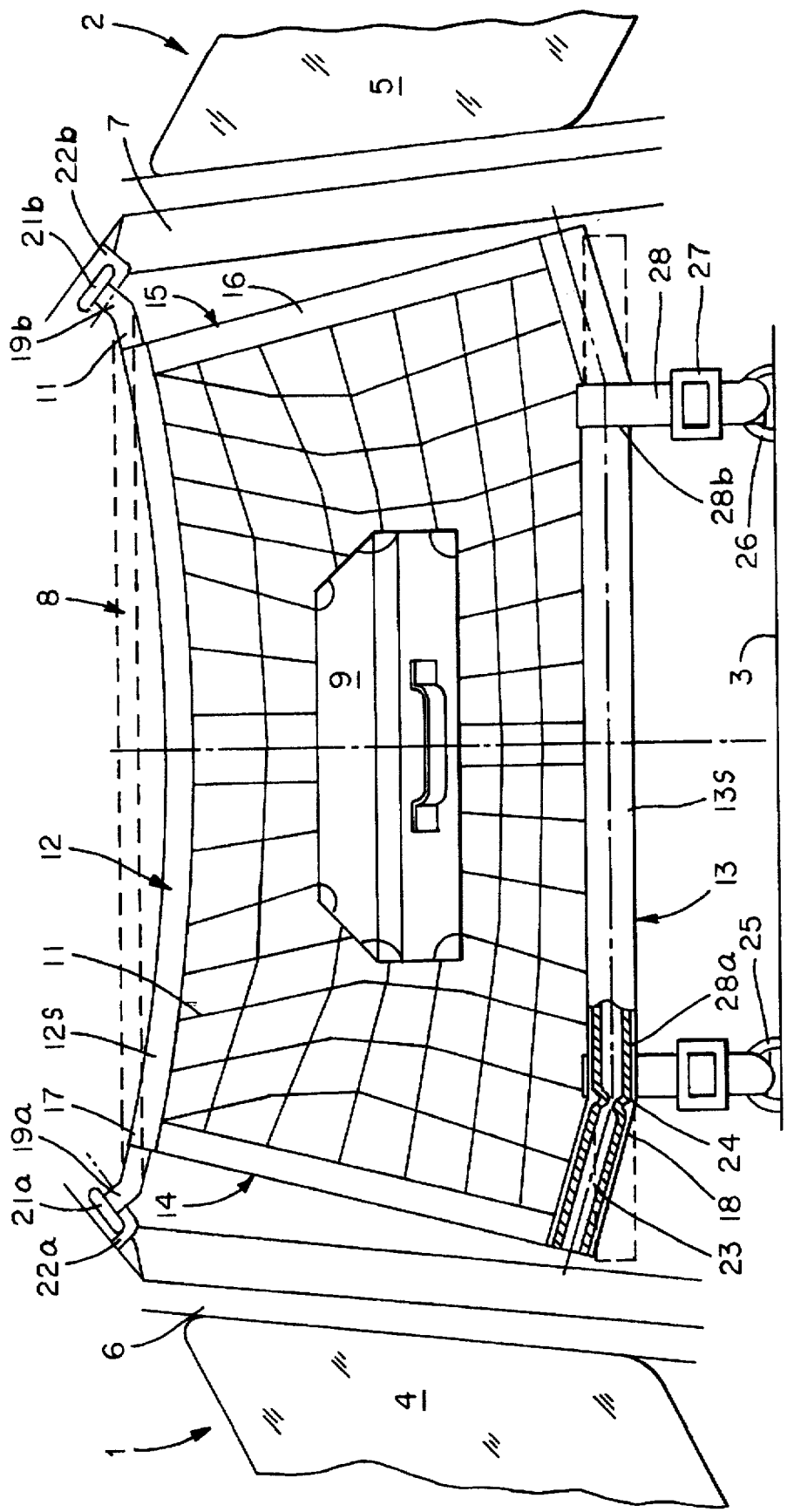
FIG. 1 is a perspective view of a safety net construction as it is being impacted upon by a projectile, looking from the rear of a utility vehicle.

While the invention has various modifications and alternative constructions, one illustrated embodiment thereof has been shown in the drawing and will be described below in detail. It should be understood, however, that there is no intention to limit the invention to the specific form disclosed, but on the contrary, the intention is to cover all modifications, alternative constructions and equivalents falling within the spirit and scope of the invention. Likewise, it should be understood that certain details which are not necessary for understanding the invention have been omitted for clarity.

DETAILED DESCRIPTION OF A PREFERRED EMBODIMENT

The present invention generally relates to a safety net construction with at least one frame piece that includes weakened segments to provide a distribution of applied tension forces toward the central portions of the net. The invention is intended for use in utility vehicles and the like where a cargo or storage compartment adjoins a passenger compartment with an open space disposed therebetween.

FIG. 1 illustrates an interior region of a utility vehicle, looking from the rear of the vehicle. The interior region is defined by opposed side walls 1, 2, each of which includes a side window 4, 5, respectively. In the vehicle interior shown, a pair of opposed, vertically extending columns 6, 7 are in abutting relation with the sidewalls 1, 2. The columns are located in a transition area that separates the passenger compartment from a rear zone or storage compartment. FIG. 1 also shows a storage compartment floor 3 spaced rearwardly from the columns 6, 7.

A safety net construction 8 according to the present invention is disposed proximate the opposed columns 6, 7 in the transition area between the passenger compartment and the storage compartment. As explained in greater detail below, the safety net construction 8 provides a buffer between the storage compartment and the passenger compartment that prevents relatively large projectiles from entry into the passenger compartment during a collision or other sudden change in vehicle movement. At the same time, the safety net construction 8 permits a relatively unrestricted view out the rear of the vehicle.

The main structural components of the safety net construction 8 include a generally rectangular safety net body 11, which is bounded by an upper marginal edge 12, a lower marginal edge 13, and opposed lateral edges 14, 15. The lateral edges 14, 15 each terminate with a sewed-on foldover strip of fabric, one of which is shown in FIG. 1 as strip 16. These opposed strips provide lateral structural support for the net body 11.

While the preferred embodiment of the invention is shown and described as a rectangular net geometry, the safety net may alternatively have other configurations. That is, it is intended that the periphery of the safety net 11 will generally conform to, and be adapted to fit within, the transition area opening between the vehicle passenger compartment and the storage compartment. Ordinarily, this area is bounded by the rear seat rest and extends upwardly therefrom to the interior roof.

In order to provide adequate structural support for the safety net 11, an elongate folded-over fabric strip 12s is affixed to the upper marginal edge 12 and extends between the opposed lateral edges 14, 15. Likewise, an elongate folded-over fabric strip 13s affixed to the lower marginal edge 13 extends the lengthwise dimension of the safety net 11 between the opposed lateral edges 14, 15. Preferably, the upper and lower strips 12s, 13s are fabric strips that are folded over and sewn together to form elongate upper and lower sleeves 17, 18. The upper and lower sleeves 17, 18 are each adapted to form a continuous sheath that spans the lengthwise dimension of the safety net 11.

In order to suspend the net 11 proximate to the vehicle ceiling, an upper frame piece 19 is located within the upper sleeve 17. In the preferred embodiment, the upper frame piece 19 is a tubular rod having opposed ends 19a, 19b that project outwardly from the edges of the upper sleeve 17. The opposed frame piece ends 19a, 19b are each preferably angled upwardly and terminate with mushroom-shaped heads 21a, 21b, respectively. The mushroom-shaped heads 21a, 21b are adapted for mating engagement with opposed receiving slots 22a, 22b formed in the respective side walls of the vehicle interior proximate to the interior ceiling. In this way, the net 11 may be suspended substantially from the vehicle ceiling.

The upper frame piece 19 is preferably fabricated from a metal tube such as steel. However, the frame piece 19 may also comprise energy-absorbing materials, such as is described in DE-A-40 10 209 .

FIG. 1 also illustrates the details of a lower frame piece 23 according to the present invention. The lower frame piece 23 is similarly located within the lower sleeve 18 formed by the corresponding fabric strip 13s. Preferably, the frame piece 23 is also a tubular rod extending the lengthwise dimension of the safety net 11. Although the frame piece 23 extends between the side edges 14, 15 of the net, it does not protrude outwardly from the side edges.

In accordance with the one aspect of the invention, the lower frame piece 23 includes weakened frame segments provided at desired locations. When the frame piece 23 is fabricated from a metal rod, the weakened segments may be provided as a pair of spaced-apart bends formed in the frame piece 23, each of which is spaced inwardly from a respective frame piece end. One of the bends is illustrated in FIG. 1 in the fragmentary portion thereof. As shown there, the bend is a corrugation 24 that circumscribes the frame piece 23. In this way, the corrugation 24 defines a weakened segment at which the frame piece 23 deforms when it is subjected to tension forces applied to either side of the corrugation 24.

It should be understood that a corresponding weakened segment is also located proximate to the opposed end of the frame piece 23. While the corresponding weakened segment is also preferably a corrugation formed in the frame piece 23, the weakened segments of the frame piece 23 are not necessarily formed in this manner. To the contrary, the weakened frame piece segments may be formed by any suitable manner so long as the frame piece 23 will undergo deformation at the desired location upon the application of tension forces to the safety net 11.

In order to fasten the lower portion of the safety net construction, a pair of opposed straps 28 are adapted for receipt within a pair of opposed loops 25, 26 disposed in the luggage compartment floor. The straps 28 are positioned at attachment locations 28a, 28b on the lower sleeve 18, spaced inwardly from the respective lateral edges of the net body and from the weakened segments of the lower frame piece. The straps are secured with the use of retaining buckles such as retaining buckle 27.

In accordance with another aspect of the invention, the spacing between the fastening locations 28a, 28b of the opposed straps 28 is less than the lengthwise dimension of the lower marginal edge 13 of the net 11. In addition, the spacing between these fastening locations is less than the spacing of the weakened frame segments 24. Stated differently, the weakened frame segments 24 are disposed outwardly from the fastening locations 28a, 28b.

In order to transfer the tension forces away from the lateral edges and toward the central portion of the net 11, the deformable or weakened segments 24 provide a programmed deformation of the lower frame piece 23. This avoids enlargement or stretching of the net body 11 at the outer lateral regions thereof where the net is particularly susceptible to breakage or tearing. This arrangement transfers the greatest tension forces applied to the safety net from the outer lateral margins toward the central portion of the net. In the preferred embodiment, this is achieved by the weakened segments in the frame piece 23, which are formed simply by corrugating a tubular rod.

As noted above, FIG. 1 illustrates the net construction as it is being impinged by a projectile such as a suitcase 9. In its original state, the upper and lower frame pieces 19, 23 are relatively straight, as depicted in phantom. The safety net body 11 extends between the upper and lower frame pieces 19, 23 and presents a relatively upright, loosely tensioned net surface. In this regard, the lower frame piece 23 may be secured within the lower marginal sleeve 18 with the use of a suitable cement or epoxy to prevent inadvertent relative movement between the lower frame piece 23 and the lower sleeve 18. Thus, the deformation of the upper and lower frame pieces 19, 23 shown in FIG. 1 occurs only when the safety net 8 is impinged upon such as when the suitcase 9 is thrust forward during a collision.

When a projectile such as the suitcase 9 shown in FIG. 1 is thrust from the storage compartment toward the passenger compartment and impinges on the net body 11, the safety net body is deformed. The resulting kinetic energy transfer can be partially absorbed by the safety net body 11 and by the frame pieces 19, 23 with the selection of suitable materials as is known in the art. Such material selection, however, cannot adequately prevent damage to the safety net body 11 if, as a consequence of the collision, the vehicle body is deformed such that the distance between the loops 25, 26 that are utilized to secure the lower frame piece 23 and the receiving slots 22a, 22b that retain the upper frame piece 19 is increased. Even without deformation of the vehicle body, such distance changes frequently occur when the upper frame piece 19 is bent or otherwise deformed as a result of impact of the projectile 9 on the safety net body 11. Tension forces are applied to the safety net body 11, particularly in directions parallel to the lateral edges 14, 15 of the net body. Absent adequate relief, such forces tend to unduly stress the lateral edges 14, 15 and cause net tearing and breakage.

In order to relieve the tension forces applied to the lateral edges 14, 15, the lower frame piece 23 deforms at the spaced weakened segments thereof. Accordingly, the greatest tension forces are displaced from the marginal edges 14, 15 toward the central portion of the net body 11. This provides a concomitant reduction to the risk of net tearing at the lateral edges and failure of the safety net. In this way, relatively large projectiles such as the suitcase 9 shown in FIG. 1, that otherwise would pose a serious risk of injury to passengers, have their forward movement restricted.

Accordingly, a safety net construction meeting the aforestated objectives has been described. The net construction is adapted to include a lower marginal edge having a frame piece with desired weakened segments located at a selected distance from the outward-lying ends. The lower marginal edge of the safety net is fastened to the vehicle from attachment locations spaced closer together than the spacing of the weakened segments. This construction resists breakage of the safety net since the bending places absorb the breakage upon collision of the vehicle.

What is claimed is:

1. A safety net construction disposed between a passenger compartment and an article storage compartment in a utility vehicle interior defined by a vehicle ceiling, opposed side walls and a rear passenger seat back, comprising:

a net body including an upper marginal edge extending substantially between the vehicle side walls proximate to the vehicle ceiling, a lower marginal edge extending substantially between the vehicle side walls proximate to the rear passenger seat back;

a first elongate frame piece attached to the upper marginal edge of the net body, the first frame piece having its opposed ends connected to the vehicle side walls to suspend the net body therefrom;

a second elongated frame piece attached to the lower marginal edge of the net body, said second elongated frame piece being secured to the vehicle at a central fastening location intermediate ends of the second frame piece;

said second frame piece including a pair of spaced weakened segments each being disposed intermediate the central fastening location and one of the ends of the second frame piece, at least one of said weakened segments being inelastically deformable in response to the net body incurring tension forces upon impact by an article in the storage compartment as a result of a sudden change in the speed of the vehicle for minimizing tearing stresses in marginal edges of the body.

2. The safety net construction of claim 1 wherein the opposed ends of said first frame piece are adapted to be engaged in receiving slots formed in the vehicle side walls.

3. The safety net construction of claim 1 including a pair of spaced retaining members secured between the fastening location of the second frame piece and the vehicle.

4. The safety net construction of claim 1 wherein the second frame piece is a metal tube.

5. The safety net construction of claim 1 wherein at least one of the weakened segments is formed by a weakening in the strength of the material of the second frame piece at a particular location.

6. The safety net construction of claim 1, wherein at least one of the weakened segments is formed by a shape-change of the second frame piece.

7. The safety net construction of claim 6, wherein the shape change is a cross section change.

8. The safety net construction of claim 6, wherein the shape change is a corrugation.

9. The safety net construction of claim 8, wherein the corrugation is circumscribed around the periphery of the second frame piece at a selected location.

10. The safety net construction of claim 1 further including an first fabric strip attached to the upper marginal edge of the net body, the first fabric strip being folded over to form a receiving sleeve retaining the first frame piece therein.

11. The safety net construction of claim 10 further including an second fabric strip attached to the lower marginal edge of the net body, the second fabric strip being folded over to form a receiving sleeve retaining the second frame piece therein.

12. The safety net construction of claim 11 further including third and fourth fabric strips, each of which is attached to a respective side edge of the net body, the third and fourth fabric strips being folded over to provide structural support to the side edges of the net body.

13. A safety net construction disposed between a passenger compartment and an article storage compartment in a utility vehicle interior defined by a vehicle ceiling, opposed side walls and a rear passenger seat back, comprising:

a safety net including an upper marginal edge located proximate to the vehicle ceiling, a lower marginal edge located proximate to the rear passenger seat back, and a pair of opposed side edges located proximate to the respective side walls, the net including opposed fabric strips affixed to the side edges, an upper fabric strip affixed to the upper marginal edge, and a lower fabric strip affixed to the lower marginal edge;

a first frame piece adapted to be received within the upper fabric strip with its ends exposed for attachment to the vehicle side walls proximate to the vehicle ceiling;

a second frame piece adapted to be received within the lower fabric strip, said second frame piece being secured to the vehicle at a central fastening location intermediate ends of the second frame piece;

the second frame piece including a pair of bendable segments each being disposed intermediate the fastening location and one of the ends of the frame piece, the bendable segments being inelastically deformable in response to the safety net incurring tension force upon impact by an article in the storage compartment as a result of a sudden change in the speed of the vehicle for minimizing tearing stresses in marginal edges of the net body.

14. The safety net construction of claim 13 including a pair of spaced retaining members secured between the fastening location of the second frame piece and the vehicle.

* * * * *